(12) United States Patent
Jang et al.

(10) Patent No.: US 6,873,775 B2
(45) Date of Patent: Mar. 29, 2005

(54) GRADED-INDEX OPTICAL FIBER

(75) Inventors: Yun-Geun Jang, Gumi-si (KR); Sung-Wook Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/883,057

(22) Filed: Jul. 1, 2004

(65) Prior Publication Data

US 2005/0008312 A1 Jan. 13, 2005

(30) Foreign Application Priority Data

Jul. 11, 2003 (KR) .................................. 10-2003-0047296

(51) Int. Cl.[7] .................................................. G02B 6/02
(52) U.S. Cl. ........................ 385/124; 385/123; 385/27
(58) Field of Search ............................ 385/27, 28, 123, 385/124, 127, 128, 29

(56) References Cited

U.S. PATENT DOCUMENTS

| | | | | |
|---|---|---|---|---|
| 4,286,979 A | * | 9/1981 | Buckler et al. ................ | 65/378 |
| 4,339,174 A | * | 7/1982 | Levin ........................... | 385/142 |
| 4,804,248 A | * | 2/1989 | Bhagavatula ................ | 385/28 |
| 6,400,450 B1 | * | 6/2002 | Golowich et al. ........... | 356/73.1 |
| 6,542,679 B2 | * | 4/2003 | DiGiovanni et al. ......... | 385/123 |
| 6,574,403 B1 | * | 6/2003 | Golowich et al. ........... | 385/123 |
| 2003/0128942 A1 | * | 7/2003 | DiGiovanni et al. ......... | 385/123 |

\* cited by examiner

Primary Examiner—Brian M. Healy
(74) Attorney, Agent, or Firm—Cha & Reiter, L.L.C.

(57) ABSTRACT

An optical fiber having a core that has a graded refractive index profile is disclosed. A clad surrounds the core and traps light within the core. A difference between differential mode delays (DMDs) at wavelengths of about 1300 nm and about 850 nm within the core is increased in a radial direction. The difference between the DMDs at both the wavelengths basically has a value equal to or less than 0.6 ns/km between a position corresponding to 50% of a radius of the core and a center of the core.

12 Claims, 17 Drawing Sheets

GRADED-INDEX OPTICAL FIBER

CLAIM OF PRIORITY

This application claims priority to an application entitled "GRADED-INDEX OPTICAL FIBER FOR HIGH BIT-RATE AND LOCAL AREA NETWORK," filed in the Korean Intellectual Property Office on Jul. 11, 2003 and assigned Serial No. 2003-47296, the contents of which are hereby incorporated by reference.

BACKGROUND OF THE INVENTION

1. Field of the Invention

The present invention relates to an optical fiber, and more particularly to a multimode optical fiber having a graded refractive index profile.

2. Description of the Related Art

Conventional optical fibers include a core and a clad surrounding the core. The core has a relatively higher refractive index, and the core has a relatively lower refractive index. Optical fibers are classified into single mode optical fibers (SMFs) and multimode optical fibers (MMFs) according to the number of optical signal modes used therein. A core provided in a graded-index optical fiber (GRIN optical fiber) of multimode optical fibers has a graded refractive index profile.

Attenuation and bandwidth characteristics are important factors that determine the performance of the multimode optical fiber. It is known that a refractive index profile of the GRIN optical fiber can improve a transmission characteristic by minimizing differential mode delay (DMD) between modes within the optical fiber. Most conventional GRIN optical fibers have been employed in communication based upon light emitting diodes (LEDs).

FIG. 1 is diagram illustrating a method for launching light into a graded-index optical fiber. As shown in FIG. 1, a graded-index optical fiber 100 includes a core 110 and a clad 120. The method for launching light into the graded-index optical fiber 100 varies according to the light source being used. When the light source uses an LED, light is irradiated on an entire section of the core 110. However, when the light source uses a laser diode (LD), light is irradiated at the center of a section of the core 110.

Conventionally, the bandwidth of graded-index optical fibers have been measured using LEDs. However, since LDs are usually used for a high-speed communication network such as Gigabit Ethernet, the graded-index optical fiber's bandwidth can also be measured using the LD.

U.S. Pat. No. 6,438,303 entitled "LASER OPTIMIZED MULTIMODE FIBER AND METHOD FOR USE WITH LASER AND LED SOURCES AND SYSTEM EMPLOYING SAME" by John S. Abbott, III et al. states that it cannot meet the transmission characteristics required for a high transmission rate at both wavelengths 850 nm and 1300 nm for use in the graded-index optical fiber.

Since the required transmission capacity is high, a multimode optical fiber is necessary to support a transmission rate of one gigabit/second or more (e.g., 2.5 or 10-gigabit Ethernet) and satisfy the transmission characteristic required for a plurality of available wavelengths. However, in the prior art there is no appropriate method relating to the multimode optical fiber.

SUMMARY OF THE INVENTION

One aspect of the present invention relates to a graded-index optical fiber that can be applied to laser diode (LD) or light emitting diode (LED)-based optical communication, that can support a transmission rate of one gigabit/second or more, and that can meet transmission characteristics required in a plurality of available wavelengths.

As described above, conventional system have a problem meeting required transmission characteristics for high transmission rates at wavelengths of 850 nm and 1300 nm, which are usually used in conventional graded-index optical fibers. Another aspect of the present invention relates to a method that addresses this problem.

One embodiment of the present invention is directed to a transmission optical fiber for use in a high bit-rate and local area network. The optical fiber includes a core having a graded refractive index profile; and a clad for surrounding the core and trapping light within the core. A difference between differential mode delays (DMDs) at wavelengths 1300 nm and 850 nm within the core is entirely increased in a radial direction. The difference between the DMDs at both the wavelengths basically has a value equal to or less than 0.6 ns/km between a position corresponding to 50% of a radius of the core and a center of the core.

BRIEF DESCRIPTION OF THE DRAWINGS

The above and other aspects, features and embodiments of the present invention will be more clearly understood from the following detailed description taken in conjunction with the accompanying drawings, in which.

DETAILED DESCRIPTION

Now, embodiments of the present invention will be described in detail with reference to the annexed drawings. In the following description, a detailed description of known functions and configurations incorporated herein will be omitted when it may obscure the subject matter of the present invention.

As described above, the attenuation and bandwidth characteristics of a graded-index optical fiber are important factors that determine the performance of the graded-index optical fiber. In addition to these optical characteristics, the differential mode delay (DMD) is another important factor. The DMD between transmission modes through a multi-mode optical fiber does not have a large effect at low transmission rates, but the DMD is a factor capable of degrading transmission quality at transmission rates of one gigabit/second or more. Despite this factor, conventionally, in order for the performance of the graded-index optical fiber to be evaluated only the bandwidth was measured. Referring to FIGS. 1 to 9, a bit error rate and DMD will be described according to various bandwidths at wavelengths of about 850 nm and about 1300 nm usually used for the graded-index optical fiber. In this regard, about 850 nm and 1300 nm means within 50 nm of 850 nm and 1300 nm, respectively.

Figure 1:
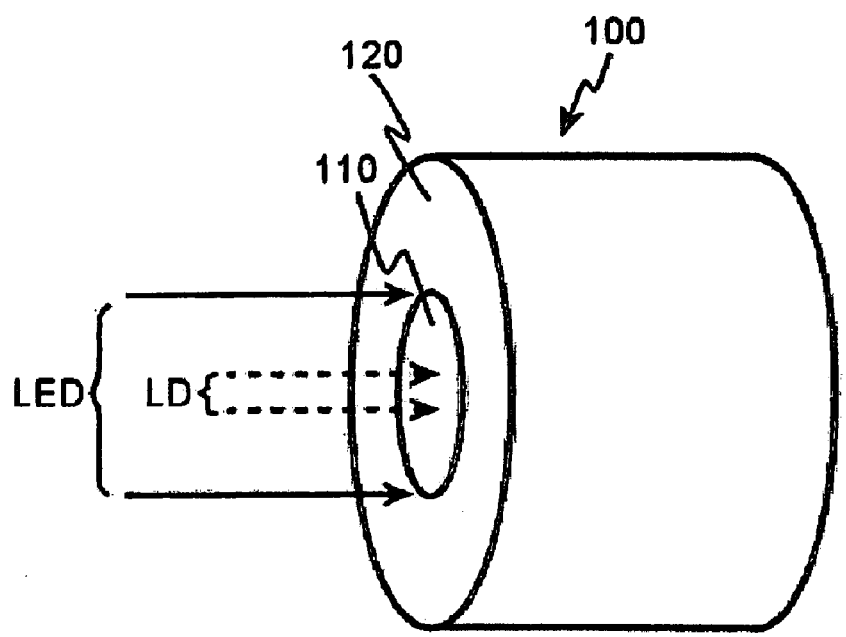
FIG. 1 is diagram illustrating a method for launching light into a graded-index optical fiber.
Figure 2:
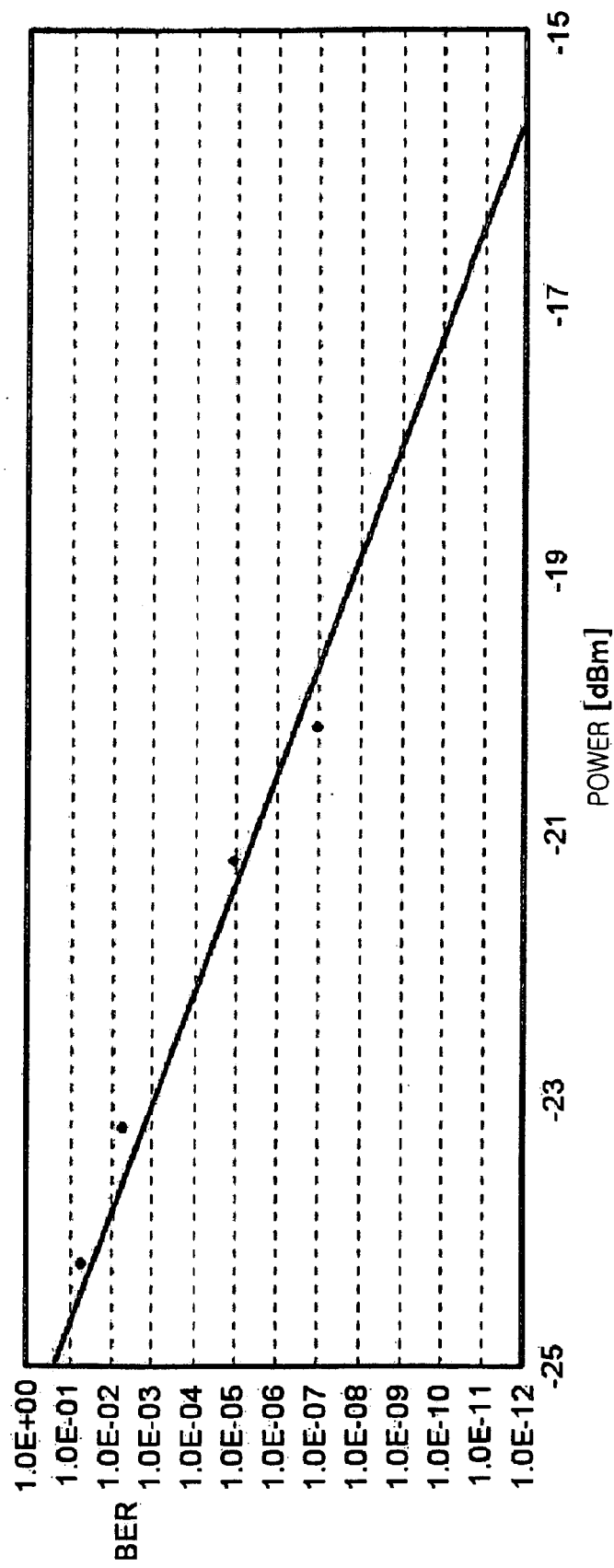
FIGS. 2 and 3 are graphs illustrating a bit error rate of the first graded-index optical fiber in accordance with the first comparative example.
Figure 3:
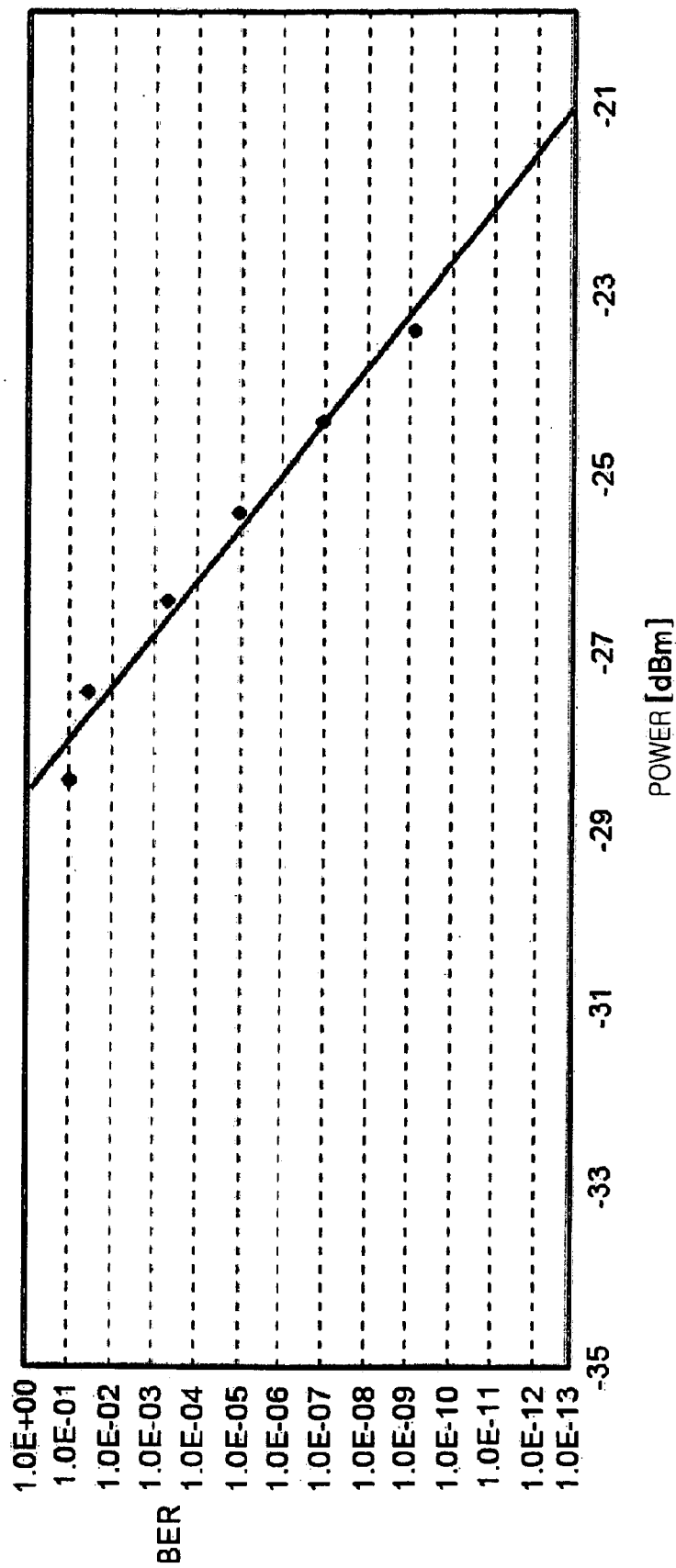
Figure 4:
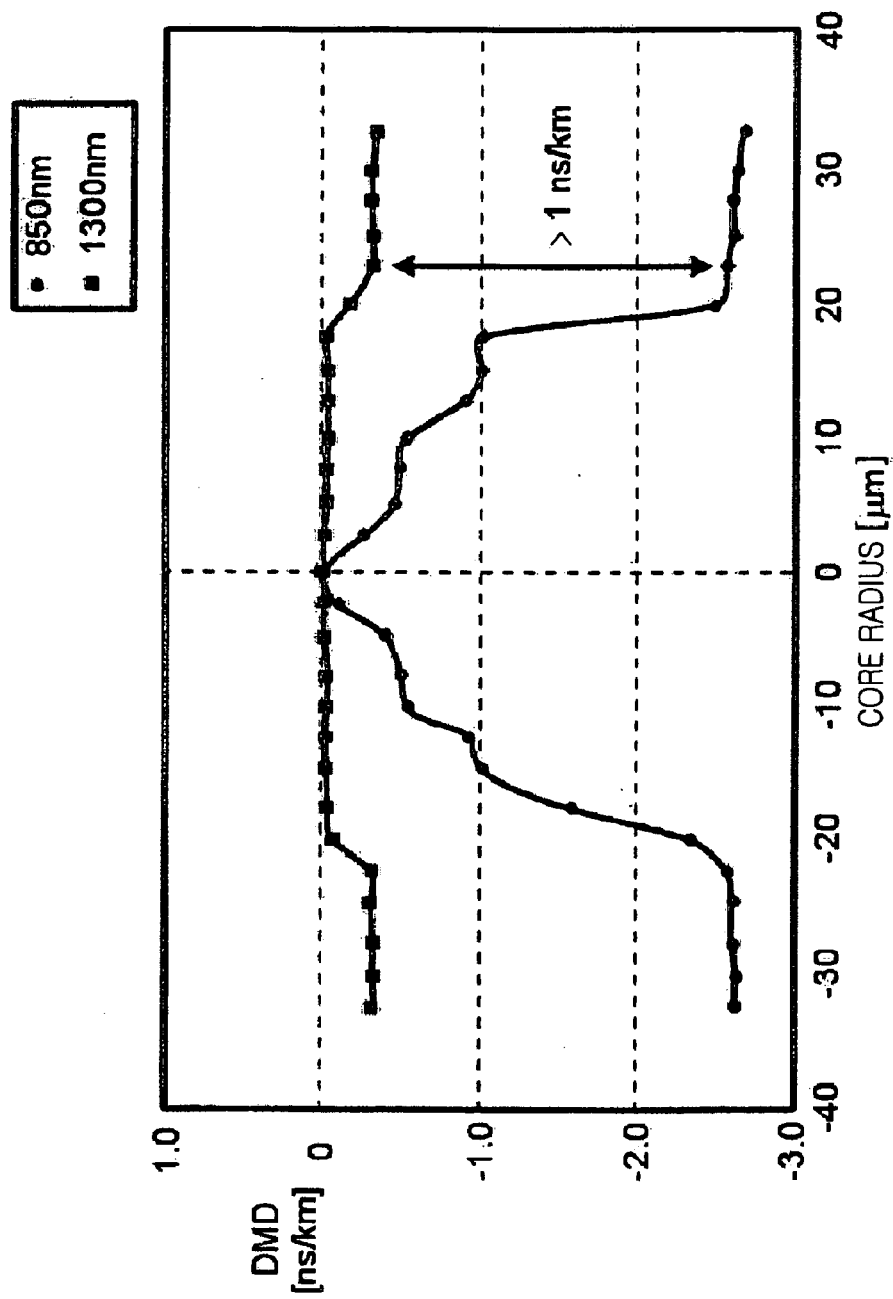
FIG. 4 is a graph illustrating differential mode delays (DMDs) of the first graded-index optical fiber in a radial direction.

FIGS. 2 and 3 are graphs illustrating a bit error rate (BER) of a first graded-index optical fiber in accordance with a first comparative example. FIG. 2 is a graph illustrating a BER on a power-by-power basis for the first graded-index optical fiber at the wavelength 850 nm of a bandwidth 300 MHz·km. FIG. 3 is a graph illustrating a BER on a power-by-power basis for the first graded-index optical fiber at the wavelength 1300 nm of a bandwidth 1100 MHz·km. FIG. 4 is a graph illustrating differential mode delays (DMDs) of the first graded-index optical fiber in a radial direction. It can be seen that a maximum difference between the DMDs of two curves shown in FIG. 4 exceeds 1 ns/km.

Figure 5:
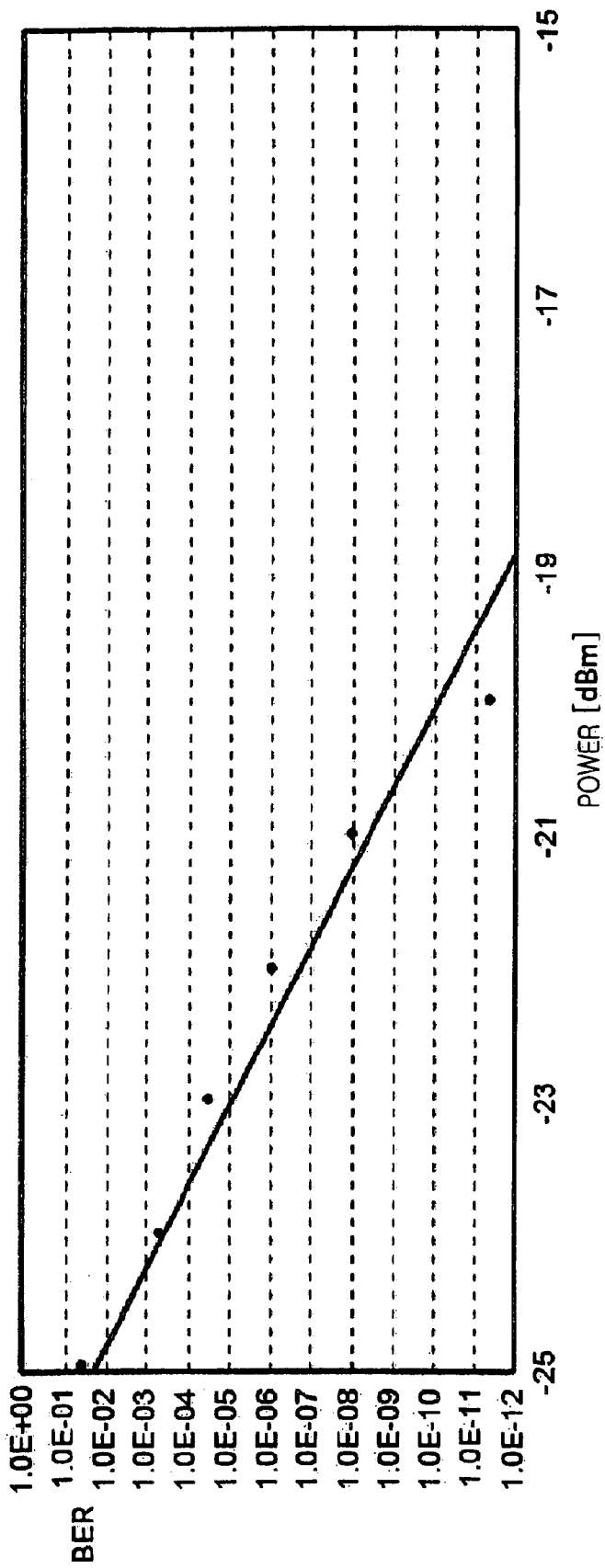
FIGS. 5 and 6 are graphs illustrating a bit error rate of the second graded-index optical fiber in accordance with the second comparative example.
Figure 6:
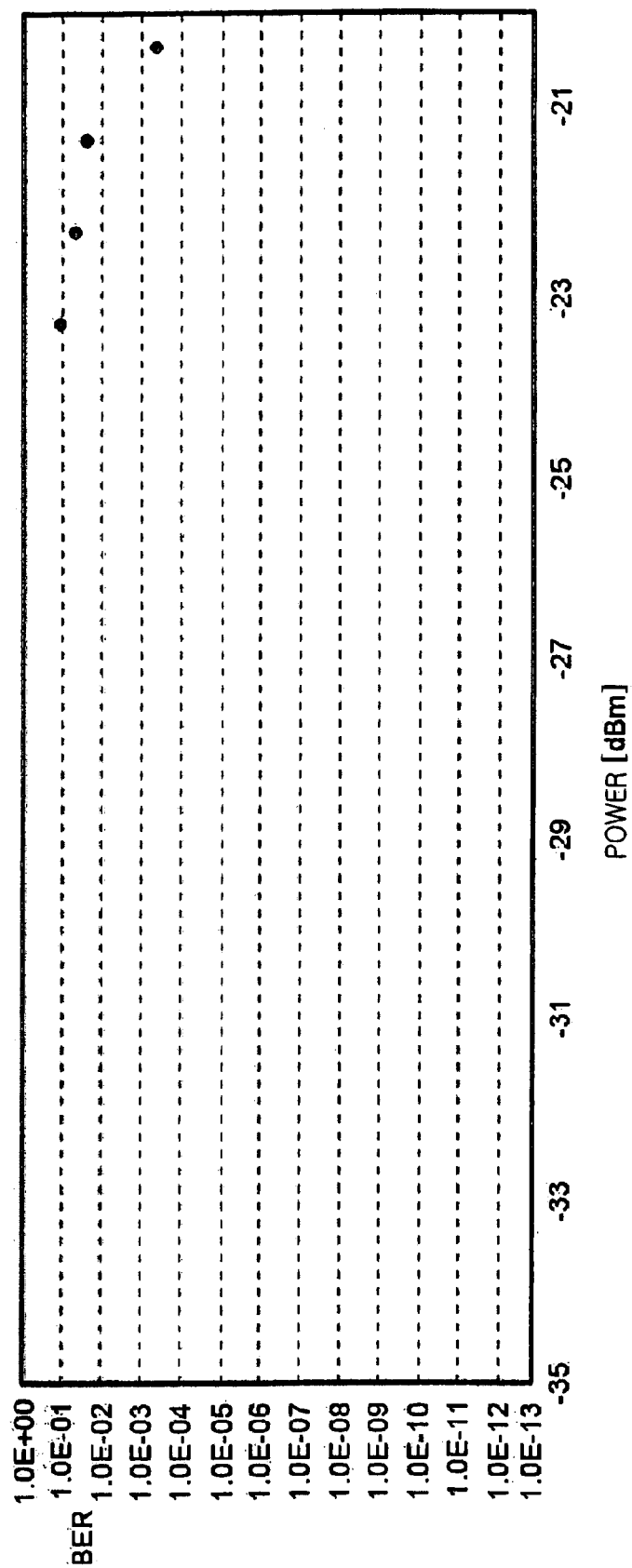
Figure 7:
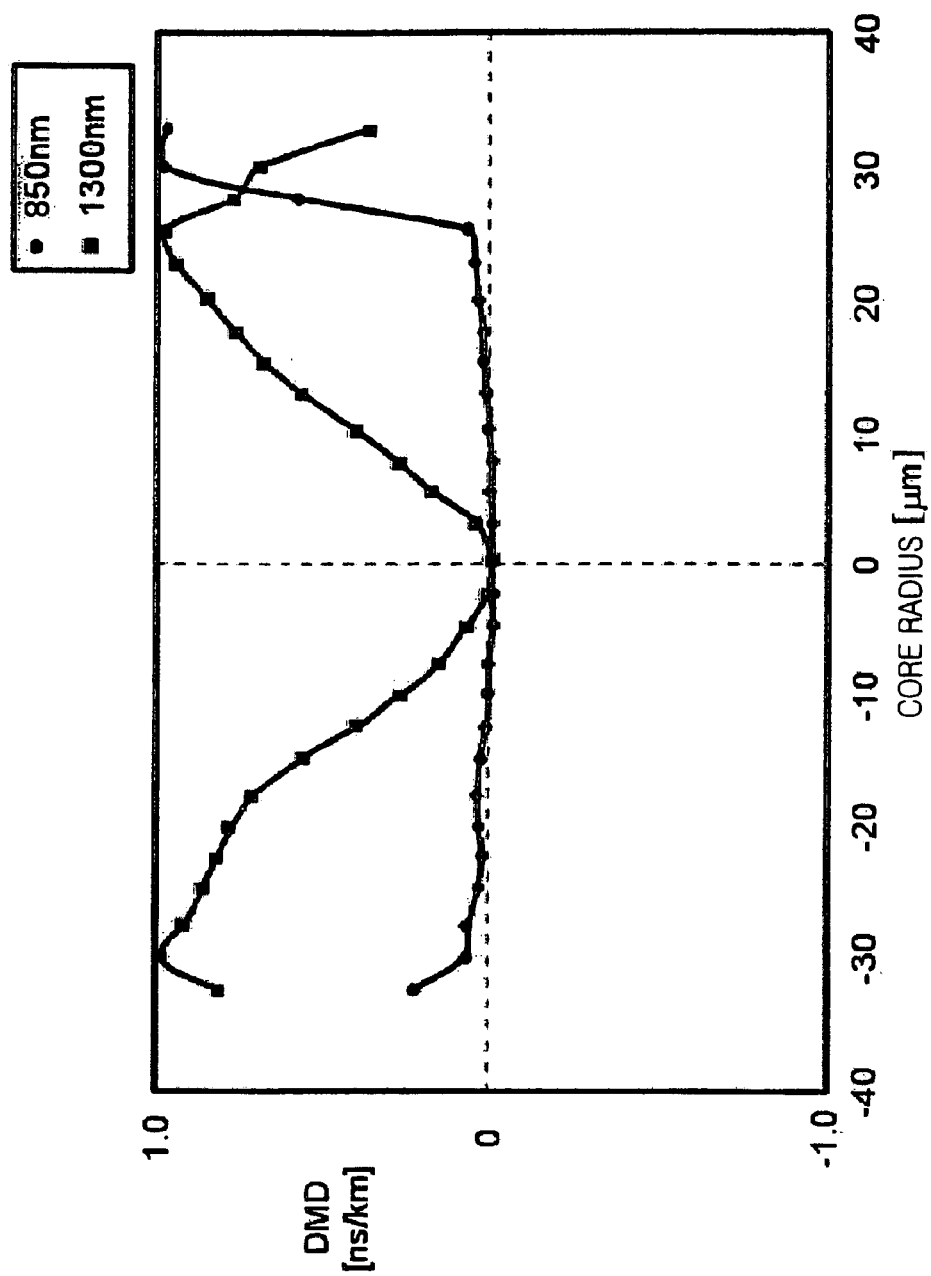
FIG. 7 is a graph illustrating DMDs of the second graded-index optical fiber in a radial direction.

FIGS. 5 and 6 are graphs illustrating a bit error rate (BER) of a second graded-index optical fiber in accordance with a second comparative example. FIG. 5 is a graph illustrating a BER on a power-by-power basis for the second graded-index optical fiber at the wavelength 850 nm of a bandwidth 4000 MHz·km. FIG. 6 is a graph illustrating a BER on a power-by-power basis for the second graded-index optical fiber at the wavelength 1300 nm of a bandwidth 600 MHz·km. FIG. 7 is a graph illustrating differential mode delays (DMDs) of the second graded-index optical fiber in a radial direction. It can be seen that a maximum difference between the DMDs of two curves shown in FIG. 7 is approximately 1 ns/km.

Figure 8:
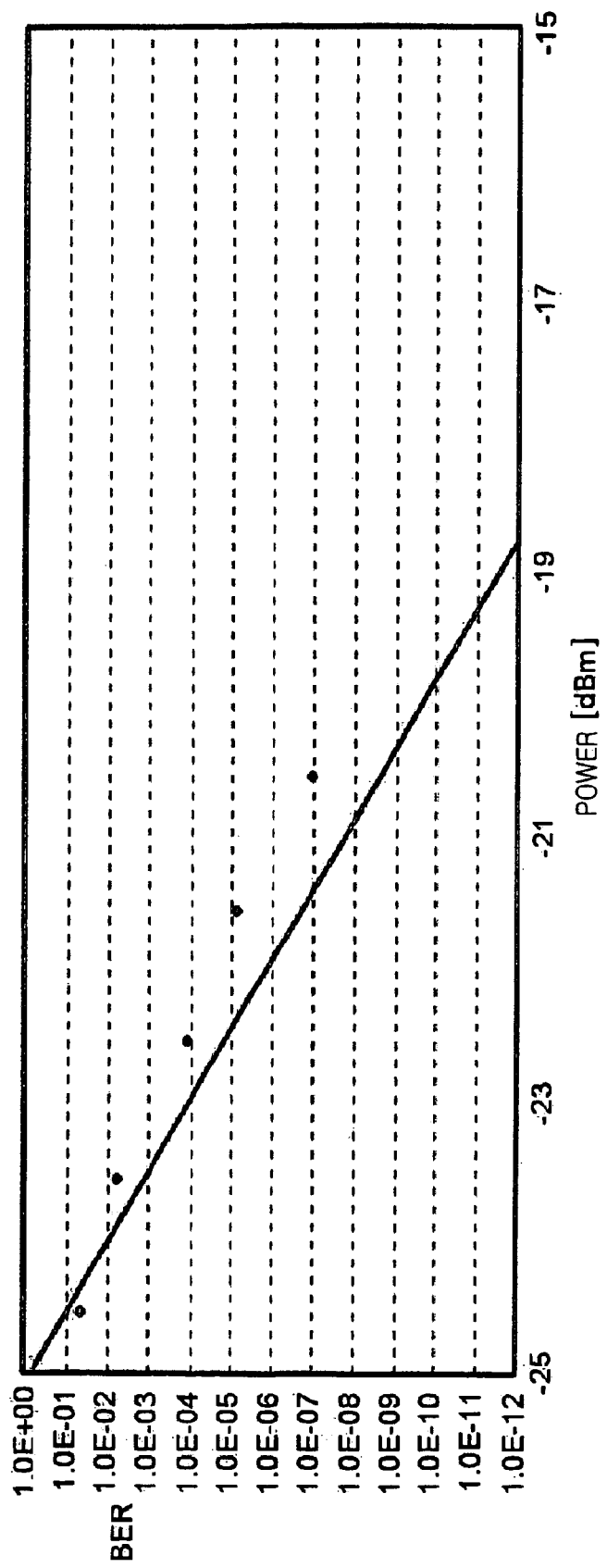
FIGS. 8 and 9 are graphs illustrating a bit error rate of the third graded-index optical fiber in accordance with the second comparative example.
Figure 9:
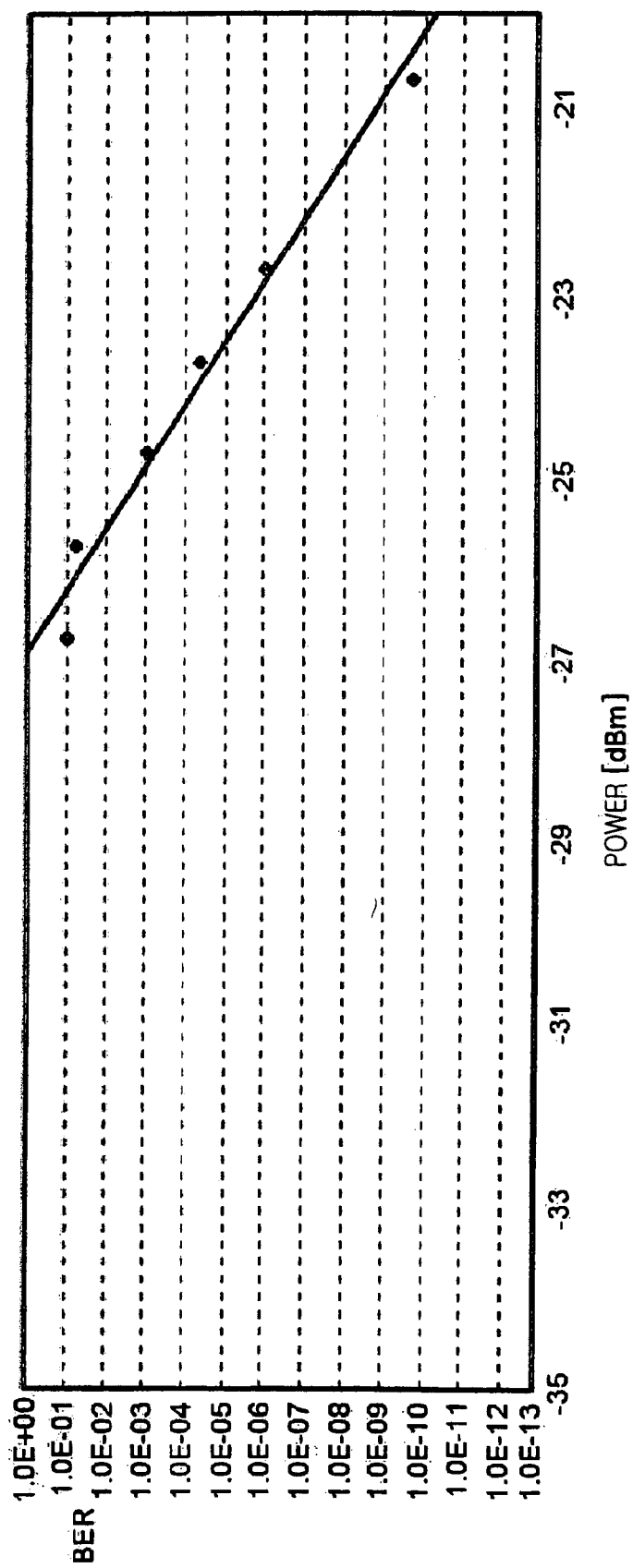
Figure 10:
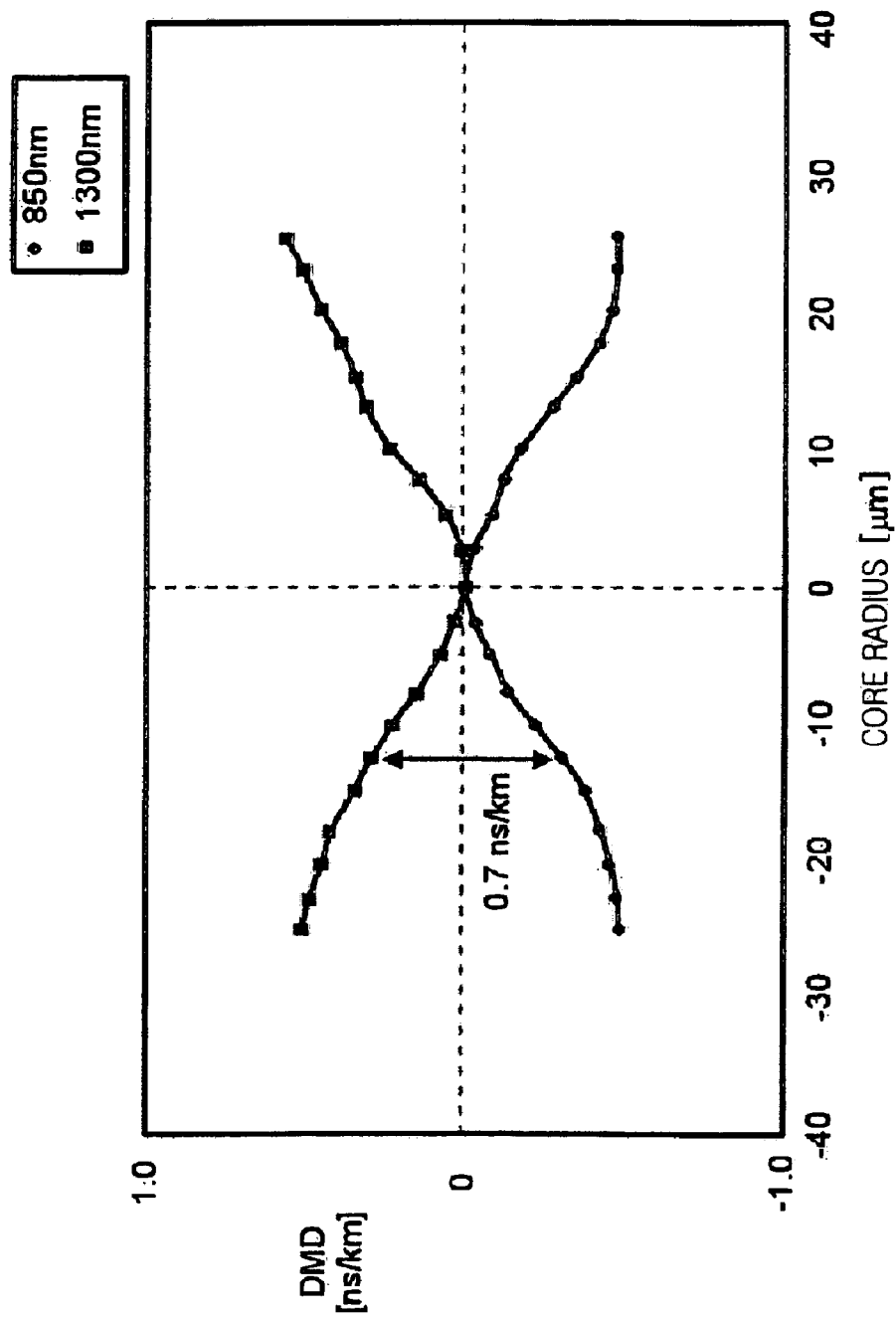
FIG. 10 is a graph illustrating DMDs of the third graded-index optical fiber in the radial direction.

FIGS. 8 and 9 are graphs illustrating a bit error rate (BER) of a third graded-index optical fiber in accordance with a second comparative example. FIG. 8 is a graph illustrating a BER on a power-by-power basis for the third graded-index optical fiber at the wavelength 850 nm of a bandwidth 1300 MHz·km. FIG. 9 is a graph illustrating a BER on a power-by-power basis for the third graded-index optical fiber at the wavelength 1300 nm of a bandwidth 600 MHz·km. FIG. 10 is a graph illustrating differential mode delays (DMDs) of the third graded-index optical fiber in a radial direction. It can be seen that a maximum difference between the DMDs of two curves shown in FIG. 10 is equal to or less than 1 ns/km. Furthermore, it can be seen that a difference between the DMDs of the two curves at a position corresponding to 50% of a core radius in the third graded-index optical fiber is approximately 0.7 ns/km.

Figure 11:
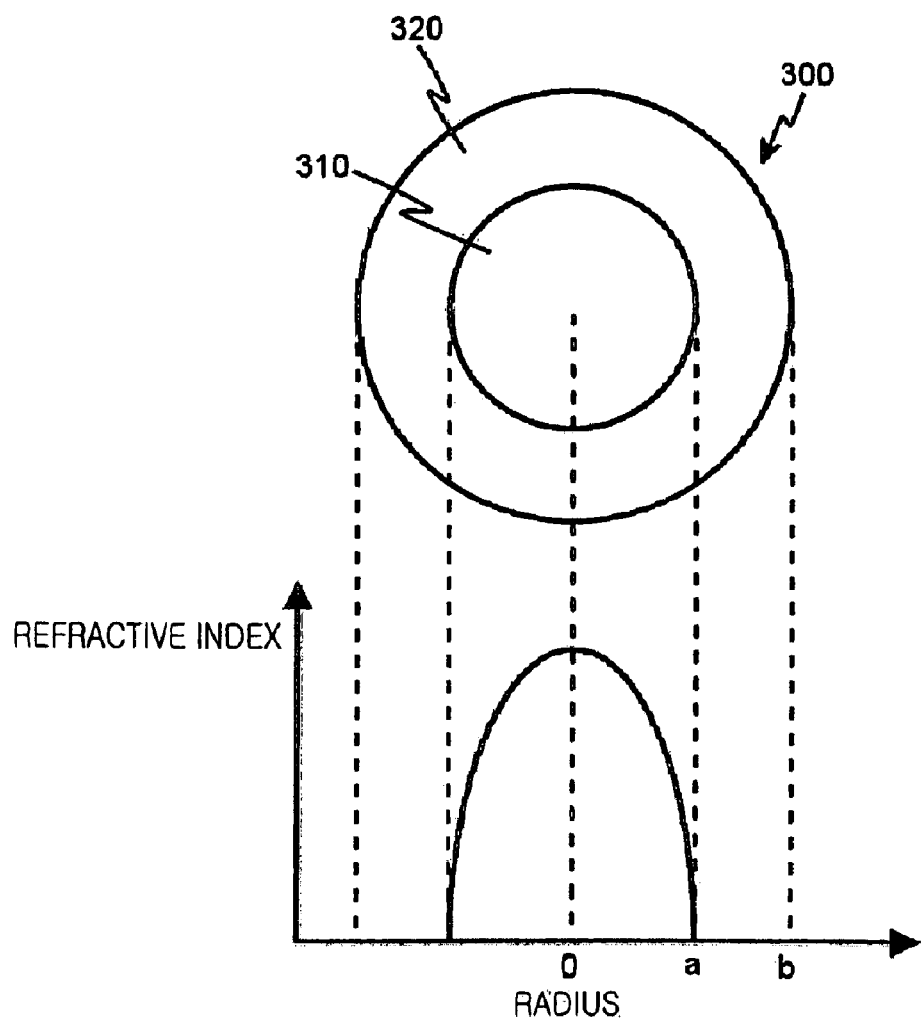
FIG. 11 is a view illustrating the configuration of a graded-index optical fiber in accordance with the present invention.

FIG. 11 is illustrating the configuration of a graded-index optical fiber in accordance with one embodiment of the present invention. A graded-index optical fiber 300 includes a core 310 having a graded refractive index profile based upon the following Equation 1, and a clad 320 for surrounding the core 310 and trapping light within the core 310. The core 310 has a radius "a", and the clad 320 has a radius "b".

$$N^2(r) = N_0^2\left[1 - 2\Delta\left(\frac{r}{a}\right)^\alpha\right] \text{ where } \Delta = \frac{(N_0^2 - N_1^2)}{2N_0^2} \approx \frac{(N_0 - N_1)}{N_1} \quad \text{Equation 1}$$

In Equation 1, "r" ($\leq a$) denotes a radius from the center of the core 310, "N" denotes a refractive index at a position of the radius r, "$\Delta$" denotes a refractive index difference, "$N_0$" denotes a refractive index of the clad 320, "$N_1$" denotes a refractive index at a position of the radius r=0, and "$\alpha$" denotes a profile shape parameter.

In a communication network using multimode optical fibers (MMFs) as well as a local area network (LAN), bandwidths at both a short wavelength (850 nm) and a long wavelength (1300 nm) must be a predetermined level or more, respectively. Since a high-speed transmission network launches light into a predetermined part of the core in the graded-index optical fiber, the deviation of a refractive index profile at the center of the core inversely affects optical transmission. It is difficult for the refractive index profile of the entire core to be formed without deviation. The propagation characteristic of a low order mode for carrying out a propagation operation at the center of the core affects a limited launching-based communication more than that of a high order mode at a portion closer to the clad. A matter property difference between paths forming the graded refractive index profile at the core causes thermal stress. To mitigate the thermal stress, a deposition condition at each path needs to be optimized.

When collapse and close processes are performed according to a modified chemical vapor deposition (MCVD) method to reduce the deviation at the center of the core, a vacuum process may be performed for precise control. Although a preform is designed according to an optimum profile shape parameter proper for regions of both wavelengths, drawing tension due to a drawing process and mechanical stress due to distortion of the refractive index profile can be incurred. The drawing process may be performed using a subsidiary heat source to reduce the mechanical stress.

Figure 12:
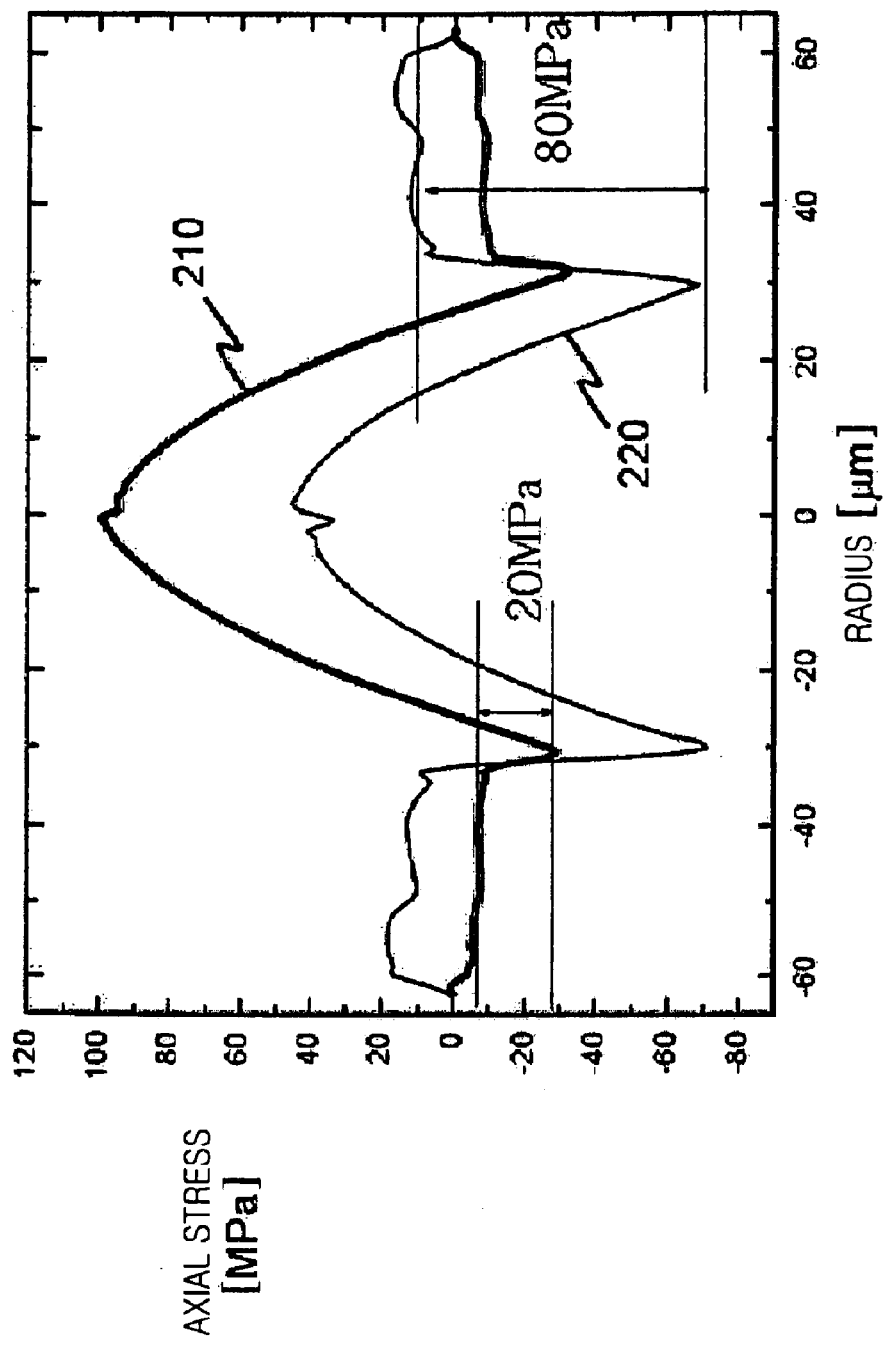
FIG. 12 is a graph illustrating stress curves of an optical fiber to which stress release is applied.

FIG. 12 is a graph illustrating stress curves of an optical fiber to which stress release is applied.

In FIG. 12, a stress curve 210 of the optical fiber to which the stress release is applied using the subsidiary heat source is compared with a stress curve 220 of the optical fiber without using any subsidiary heat source. It can be seen that a stress difference between the two stress curves is approximately 60 MPa as a result of the comparison.

Figure 13:
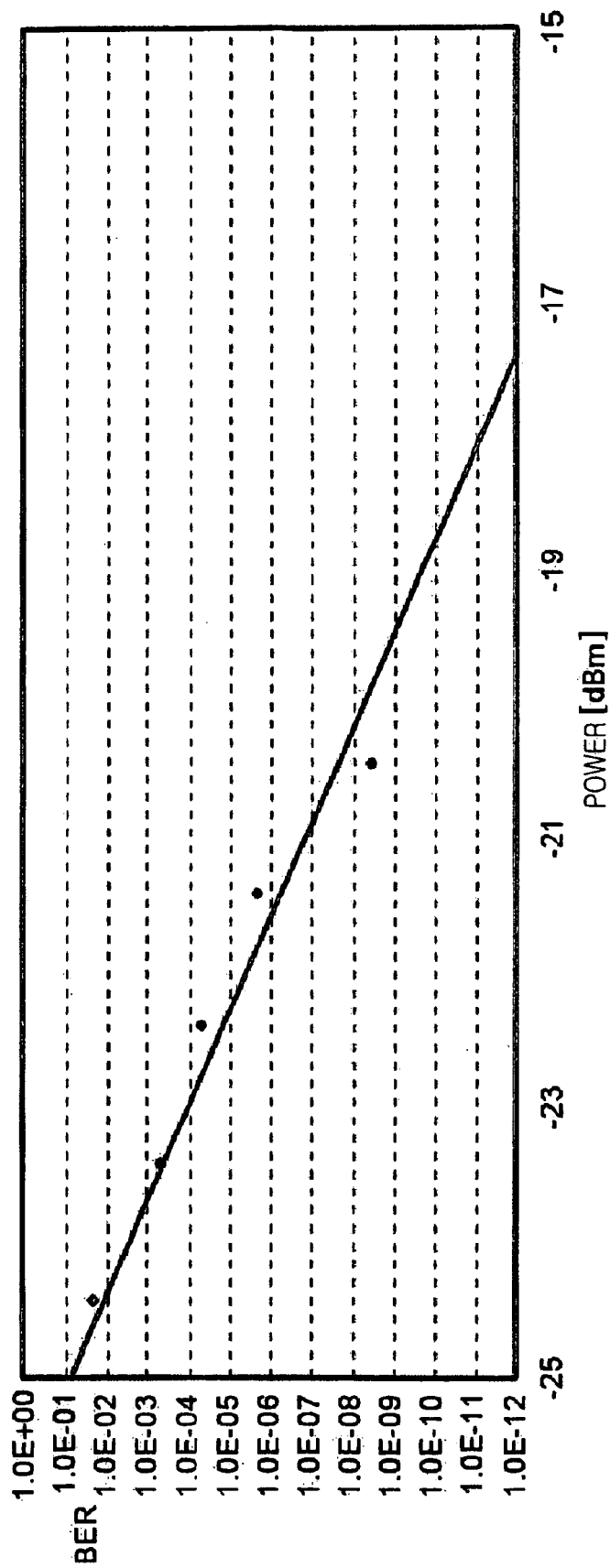
FIGS. 13 and 14 are graphs illustrating a bit error rate of the third graded-index optical fiber shown in FIG. 11.
Figure 14:
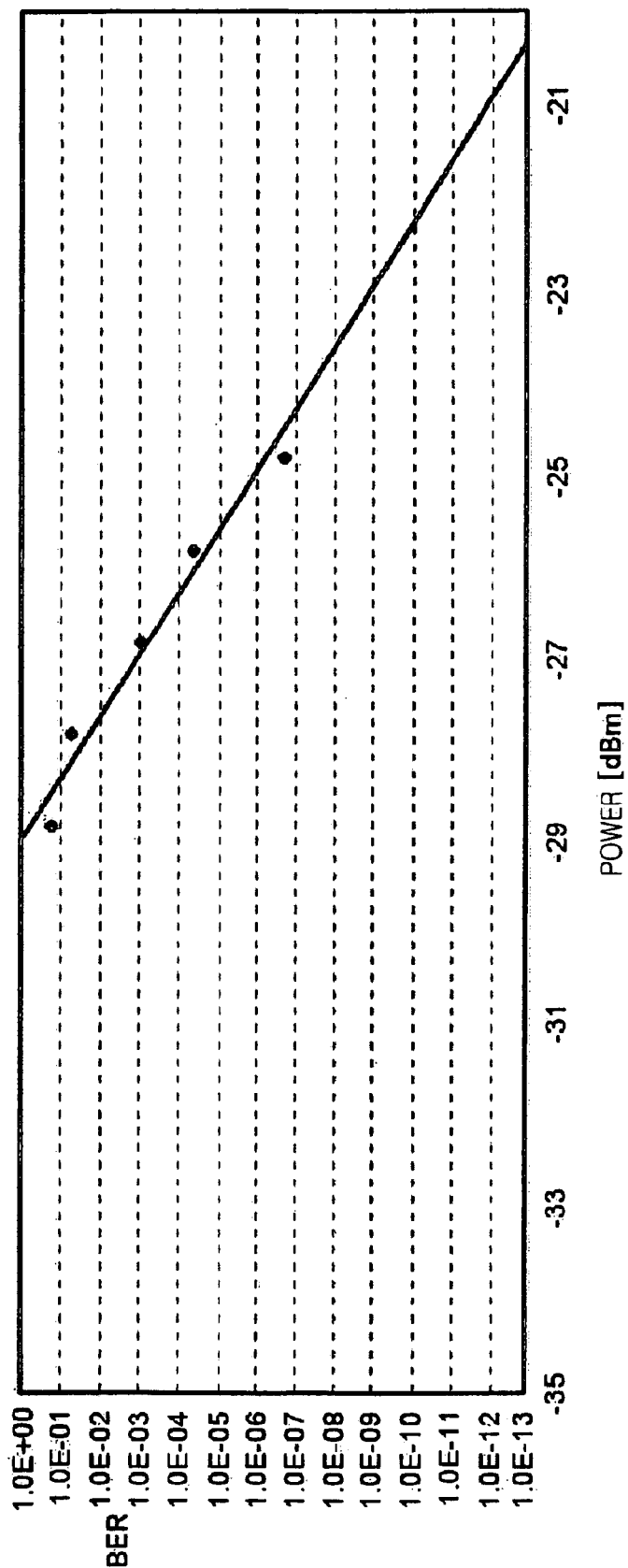
Figure 15:
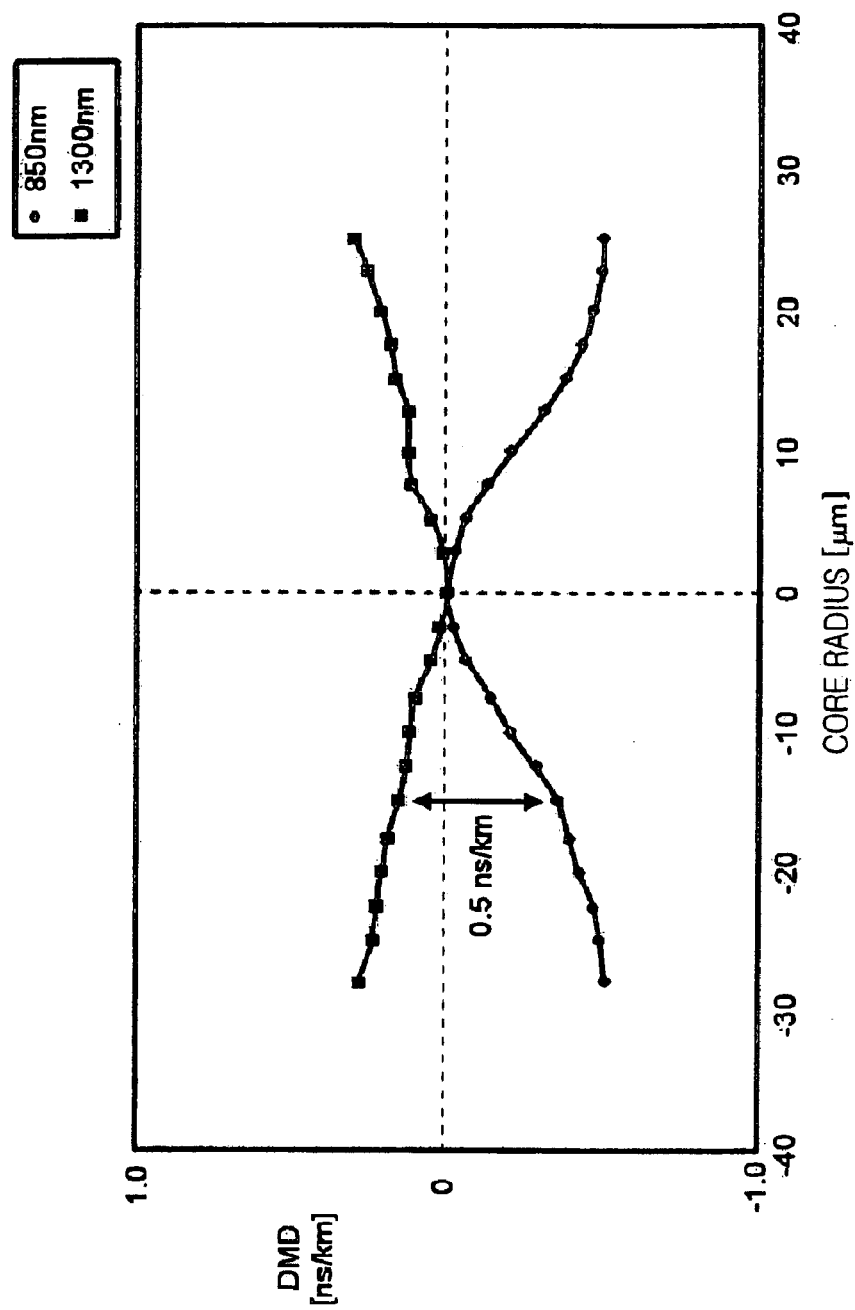
FIG. 15 is a graph illustrating DMDs of the graded-index optical fiber in the radial direction.

FIGS. 13 and 14 are graphs illustrating a bit error rate (BER) of the optical fiber shown in FIG. 11. FIG. 13 is a graph illustrating a BER of the graded-index optical fiber 300 at each power at the wavelength 850 nm of the bandwidth 850 MHz·km. FIG. 14 is a graph illustrating a BER of the graded-index optical fiber 300 at each power at the wavelength 1300 nm of the bandwidth 1400 MHz·km. FIG. 15 is a graph illustrating DMDs of the graded-index optical fiber 300 in the radial direction. It can be seen that a difference between DMDs of the wavelengths 1300 nm and 850 nm within the core is increased in the radial direction, and a maximum difference between two curves is less than 1 ns/km. Furthermore, it can be seen that a difference between the DMDs at a position corresponding to 50% of the radius of the core 310 in the graded-index optical fiber 300 is approximately 0.5 ns/km. The difference between DMDs at the entire region of the core 310 does not have effect at a high transmission rate.

Because the refractive index profile of the core 310 is a function of wavelength, refractive index profiles at the wavelengths 850 nm and 1300 nm are different. Since the conventional graded-index optical fibers use both wavelengths, a DMD difference proper for one wavelength region does not satisfy all wavelength regions. It is also noted that a high transmission rate cannot be confirmed with only a refractive index profile. To meet both wavelength regions, a difference between the DMDs at both wavelengths must be within a range containing approximately 1.2 ns/km so that the high-speed transmission can be enabled. Preferably, the difference between the DMDs at both wavelengths basically has a value equal to or less than 0.6 ns/km between a position corresponding to 50% of the radius of the core 310 and the center of the core 310. As shown in FIG. 15, the sign of an instantaneous rate of change associated with DMD at a wavelength of 1300 nm or 850 nm within the core 310 can be changed at least one time. In addition, before the instantaneous rate of change reaches zero, its absolute value is incremented and then decremented. Where the core 310 has a diameter of about 50 um, it is preferred that the absolute value of the instantaneous rate of change associated with DMD at the wavelength 1300 nm or 850 nm within the core 310 basically has a value within a range of 0~0.9 between a position corresponding to 40% of the radius of the core 310 and the center of the core 310. In this regard, about 50 um means 50 um plus or minus 10 percent. When the core 310 has a diameter of about 62.5 um, it is preferred that the absolute value of the instantaneous rate of change associated with DMD at the wavelength 1300 nm or 850 nm within the core 310 basically has a value within a range of 0~0.9 between a position corresponding to 32% of the radius of the core 310 and the center of the core 310. In this regard, about 62.5 um means 62.5 um plus or minus 10 percent.

Figure 16:
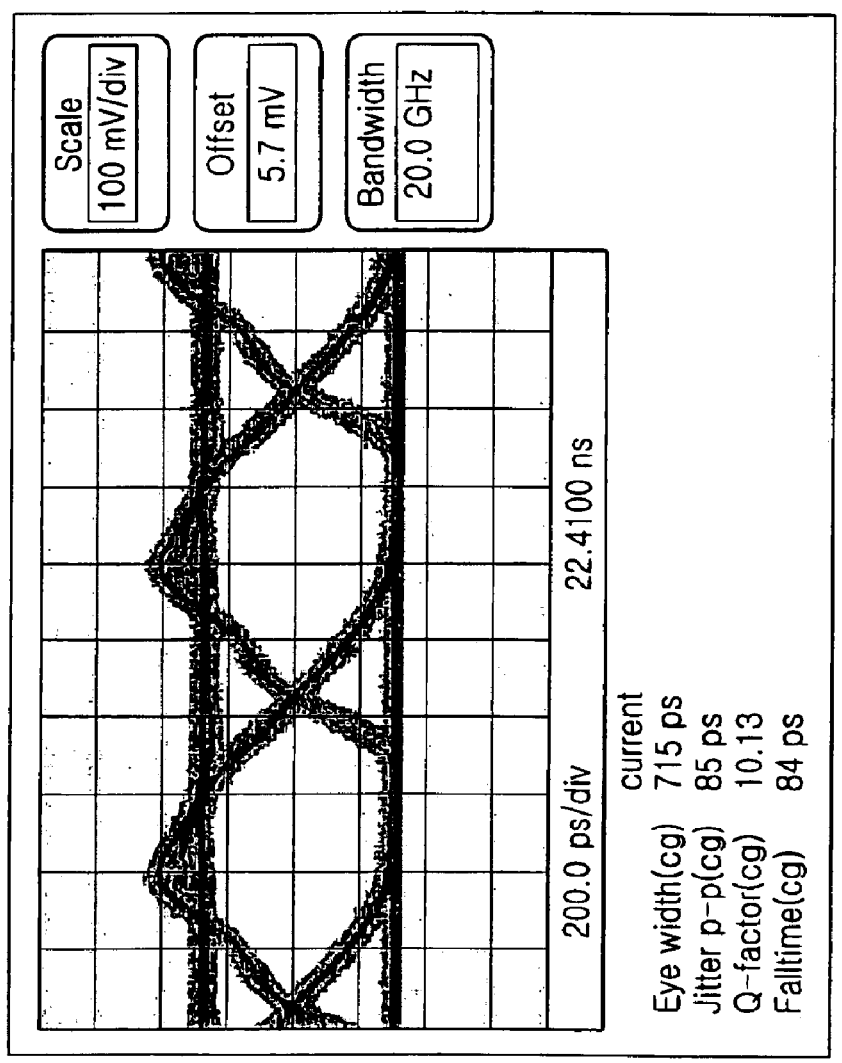
FIGS. 16 and 17 are views illustrating eye diagrams of the optical fiber shown in FIG. 11.
Figure 17:
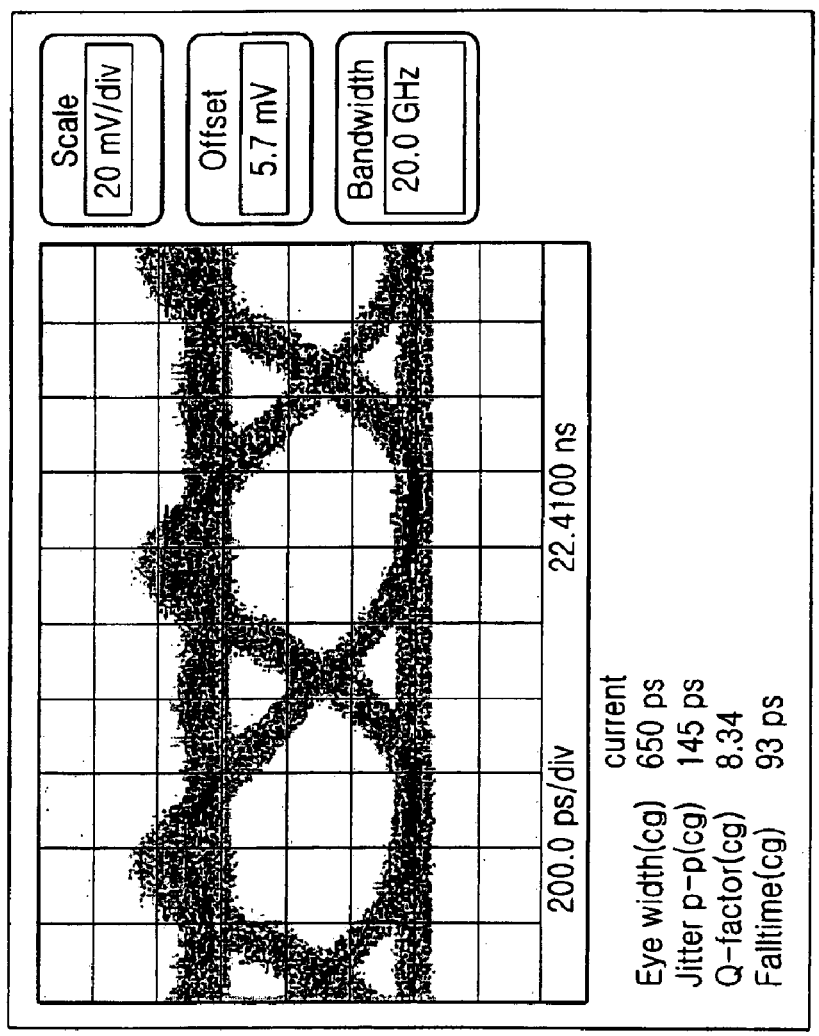

FIGS. 16 and 17 are eye diagrams of an optical fiber shown in FIG. 11. FIG. 16 is an eye diagram of the graded-index optical fiber meeting 1-gigabit/second transmission characteristics at the wavelength 850 nm. FIG. 17 is an eye diagram of the graded-index optical fiber meeting 1-gigabit/second transmission characteristics at the wavelength 1300 nm.

As apparent from the above description, various embodiments of the present invention provide a graded-index optical fiber based upon differential mode delay (DMD) appropriate for regions of wavelengths 850 nm and 1300 nm. Such graded-index optical fibers can support a transmission rate equal to or greater than one gigabit/second and can meet transmission characteristics required for a plurality of wavelengths.

Although various detailed embodiments of the present invention have been disclosed for illustrative purposes, those skilled in the art will appreciate that various modifications, additions and substitutions are possible, without departing from the scope of the invention.

What is claimed is:

1. An optical fiber comprising:

a core having a graded refractive index profile; and a clad surrounding the core, wherein a difference between differential mode delays (DMDs) at wavelengths of about 1300 nm and about 850 nm within the core is increased in a radial direction, the difference between the DMDs at both the wavelengths has a value equal to or less than 0.6 ns/km between a position corresponding to 50% of a radius of the core and a center of the core.

2. The optical fiber as set forth in claim 1, wherein the graded refractive index profile is in accordance with an equation defined as:

$$N^2(r) = N_0^2\left[1 - 2\Delta\left(\frac{r}{a}\right)^\alpha\right] \text{ where } \Delta = \frac{(N_0^2 - N_1^2)}{2N_0^2} \approx \frac{(N_0 - N_1)}{N_1},$$

"r"($\leq$a) denoting a radius from the center of the core, "N" denoting a refractive index at a position of the radius r, "$\Delta$" denoting a refractive index difference, "$N_0$" denoting a refractive index of the clad, "$N_1$" denoting a refractive index at a position of the radius r=0, "a" denoting the radius of the core, and "$\alpha$" denoting a profile shape parameter.

3. The optical fiber as set forth in claim 1, wherein a sign of an instantaneous rate of change associated with DMD at the wavelength of about 1300 nm or about 850 nm within the core is changed at least one time.

4. The optical fiber as set forth in claim 3, wherein an absolute value of the instantaneous rate of change is incremented and then decremented before the instantaneous rate of change reaches zero.

5. The optical fiber as set forth in claim 2, wherein a sign of an instantaneous rate of change associated with DMD at the wavelength of about 1300 nm or about 850 nm within the core is changed at least one time.

6. The optical fiber as set forth in claim 5, wherein an absolute value of the instantaneous rate of change is incremented and then decremented before the instantaneous rate of change reaches zero.

7. An optical fiber comprising:

a core having a graded refractive index profile; and a clad surrounding the core, wherein the core has a diameter of about 50 $\mu$m, a difference between differential mode delays (DMDs) at a first transmission wavelength and a second transmission wavelength within the core is increased in a radial direction, the difference between the DMDs at both the wavelengths basically has a value equal to or less than 0.6 ns/km between a position corresponding to 50% of a radius of the core and a center of the core, an absolute value of the instantaneous rate of change associated with DMD at the first transmission wavelength or the second transmission wavelength within the core basically has a value within a range of 0~0.9 between a position corresponding to 40% of the radius of the core and the center of the core.

8. The optical fiber as set forth in claim 7, wherein the first transmission wavelength is about 1300 nm and the second transmission wavelength is about 850 nm.

9. The optical fiber as set forth in claim 7, wherein the graded refractive index profile is in accordance with an equation defined as:

$$N^2(r) = N_0^2\left[1 - 2\Delta\left(\frac{r}{a}\right)^\alpha\right] \text{ where } \Delta = \frac{(N_0^2 - N_1^2)}{2N_0^2} \approx \frac{(N_0 - N_1)}{N_1},$$

"r"($\leq$a) denoting a radius from the center of the core, "N" denoting a refractive index at a position of the radius r, "$\Delta$" denoting a refractive index difference, "$N_0$" denoting a refractive index of the clad, "$N_1$" denoting a refractive index at a position of the radius r=0, "a" denoting the radius of the core, and "$\alpha$" denoting a profile shape parameter.

10. The optical fiber as set forth in claim 8, wherein the optical fiber is used in a high bit-rate and local arcs network.

11. An optical fiber comprising:

a core having a graded refractive index profile; and a clad surrounding the core, wherein the core has a diameter of about 62.5 μm, a difference between differential mode delays (DMDs) at wavelengths of about 1300 nm and about 850 nm within the core is increased in a radial direction, the difference between the DMDs at both the wavelengths basically has a value equal to or less than 0.6 ns/km between a position corresponding to 50% of a radius of the core and a center of the core, an absolute value of the instantaneous rate of change associated with DMD at the wavelength about 1300 nm or about 850 nm within the core basically has a value within a range of 0~0.9 between a position corresponding to 32% of the radius of the core and the center of the core.

12. The optical fiber as set forth in claim 11, wherein the graded refractive index profile is in accordance with an equation defined as:

$$N^2(r) = N_0^2\left[1 - 2\Delta\left(\frac{r}{a}\right)^\alpha\right] \text{ where } \Delta = \frac{(N_0^2 - N_1^2)}{2N_0^2} \approx \frac{(N_0 - N_1)}{N_1},$$

"r"(≦a) denoting a radius from the center of the core, "N" denoting a refractive index at a position of the radius r, "Δ" denoting a refractive index difference, "$N_0$" denoting a refractive index of the clad, "$N_1$" denoting a refractive index at a position of the radius r=0, "a" denoting the radius of the core, and "α" denoting a profile shape parameter.

* * * * *